United States Patent
Ofer et al.

[11] Patent Number: 6,055,603
[45] Date of Patent: Apr. 25, 2000

[54] METHOD AND APPARATUS FOR PERFORMING PRE-REQUEST OPERATIONS IN A CACHED DISK ARRAY STORAGE SYSTEM

[75] Inventors: Erez Ofer, Brookline; John Fitzgerald, Mansfield; Kenneth Halligan, Leominster, all of Mass.

[73] Assignee: EMC Corporation, Hopkinton, Mass.

[21] Appl. No.: 08/932,660

[22] Filed: Sep. 18, 1997

[51] Int. Cl.[7] .................................................. G06F 13/00
[52] U.S. Cl. .............................. 711/113; 711/114; 710/54
[58] Field of Search .................................... 711/113, 114, 711/169, 156; 710/54

[56] References Cited

U.S. PATENT DOCUMENTS

| | | | |
|---|---|---|---|
| 5,742,789 | 4/1998 | Ofer et al. | 711/111 |
| 5,742,792 | 4/1998 | Yanai et al. | 711/162 |
| 5,787,304 | 7/1998 | Hodges et al. | 710/1 |
| 5,787,473 | 7/1998 | Vishlitzky et al. | 711/134 |
| 5,822,513 | 10/1998 | Ofer et al. | 714/32 |
| 5,829,048 | 10/1998 | Ofer et al. | 711/166 |

Primary Examiner—Glenn Gossage
Attorney, Agent, or Firm—John Gunther; Leanne J. Fitzgerald

[57] ABSTRACT

A method of improving the performance of a storage system is provided. The method includes sending a pre-request to a logical device before data associated with the previous request is transferred from a cache to the requesting host device. Additionally, while a host controller of the storage system is transferring data from the cache to the requesting host, it will also check to see if any other requests are entered in a request queue for that logical device. To do this, the host controller checks a status flag in a mailbox location within the host controller. A disk controller is also responsive to the placement of requests in the mailbox location and can set the status flag upon a completion of a data transaction. If there has been an entry, a pre-request will be sent to the logical device while the data from the previous request is being transferred to the host.

7 Claims, 3 Drawing Sheets

METHOD AND APPARATUS FOR PERFORMING PRE-REQUEST OPERATIONS IN A CACHED DISK ARRAY STORAGE SYSTEM

BACKGROUND OF THE INVENTION

This invention relates generally to storage systems associated with computer systems and more particularly to providing a method and apparatus improving controller and cache resource utilization in a cached disk array storage system.

As it is known in the art, computer systems generally include a central processing unit, a memory subsystem and a storage subsystem. According to a networked or enterprise model of a computer system, the storage subsystem associated with or in addition to a local computer system, may include a large number of independent storage devices or disks housed in a single enclosure. This array of storage devices is typically connected to several computers (or hosts) via dedicated cabling or via a network. Such a model allows for the centralization of data which is to be shared among many users and also allows a single point of maintenance for the storage functions associated with the many computer systems.

One type of storage system known in the art is one which includes a number of disk storage devices configured as Redundant Array of Independent Disks or an array (sometimes referred to as RAID). Such a system may include several arrays of storage devices. In addition to the arrays of storage devices, typical storage systems include several types of controllers for controlling the various aspects of the data transfers associated with the storage system. One type of controller is a host controller and provides the interface between the host computers and the storage system. Another type of controller is a disk controller. There may be one or more disk controllers for each array of storage devices in a storage system. The disk controller manages the transfer of data to and from its associated array of drives.

In addition to the controllers described above, advanced storage systems, such as the SYMMETRIX® family of storage systems manufactured by EMC Corporation, Hopkenton, Mass. may include a very large memory which is coupled to each of the controllers in the system. The memory may be used as a staging area (or cache) for the data transfers between the storage devices and the host computers and may provide a communications path between the various controllers. Such systems provide superior performance to non-cache storage systems.

In order to achieve maximum performance from storage systems like those described above, each of the controllers should be kept busy doing useful work at all times when there are outstanding data requests. It would be advantageous therefore to provide a storage system wherein the host controllers and disk controllers communicate in such a way as to maximize the amount of data transferred during any given time period during which there are outstanding requests for reads or writes of data.

SUMMARY OF THE INVENTION

In accordance with one aspect of the present invention, a method of operating a storage system having a host controller, a disk controller, and a memory all interconnected by a communication bus, wherein the disk controller is further coupled to a plurality of storage devices, includes receiving a data request at the host controller. The data request is then placed into a request queue associated with the logical device that is the target of the data request. If the data request is a read request, the host controller will check to determine whether the associated data is resident in the memory. If the data is not resident in the memory, the controller places an entry in a message queue associated with the logical device which is the target of the read request. The storage controller reads the entry from the message queue and begins transferring data corresponding to the read data request from the associated logical device to the memory. After all the requested data has been placed in the memory, a notification is given to the host controller. Upon receipt of the notification, the host controller checks the request queue associated with the same logical device to determine if any other read data requests are present. If there is another read request pending, prior to transferring data corresponding to the current read data request from the memory to a the requesting host, the host controller inserts another entry in the message queue. The second entry corresponds to the pending read data request resident in the request queue. Then, the host controller begins transmitting the data corresponding to the original read data request from the logical memory to the device. During performance of the transmitting step, data associated with the other entry is transferred from the logical device to the memory as described above. With such a method, increased performance of the storage system is achieved since additional work is performed during the same elapsed time period. When the host controller finishes the original data transfer, it will find the data for the subsequent transfer in the cache resulting in a cache hit.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

Figure 1:
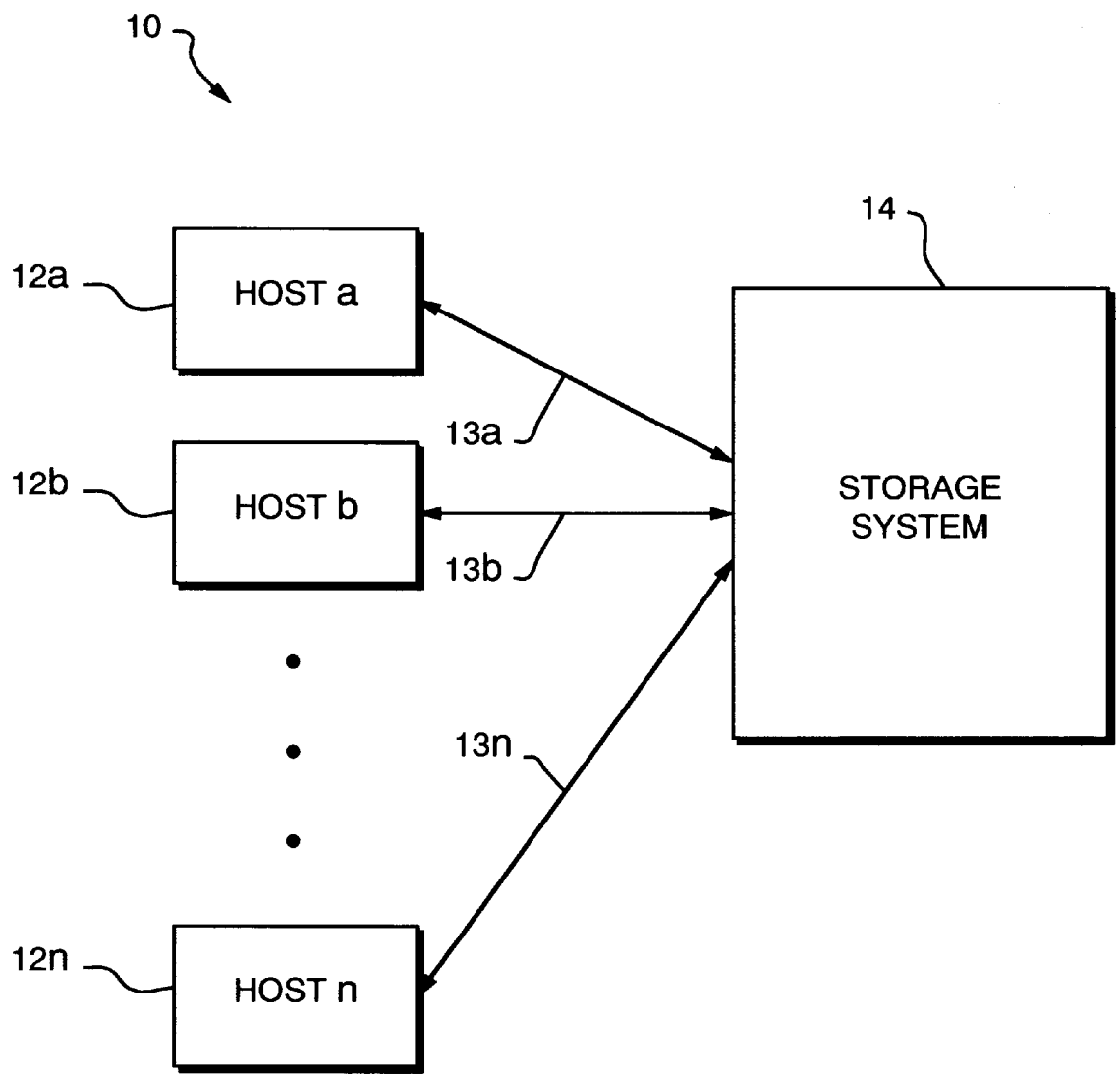
FIG. 1 is a block diagram of a computer system including a mass storage system incorporating the present invention.

Referring now to FIG. 1, computer system 10 is shown to include, among other things, a plurality of host computers 12a–12n, coupled to a storage system 14 via communication paths or busses 13a–13n respectively. The host computers may each be any of a well-known type of computer system. For example, host 12a may be a mainframe computer or may be an open-systems computer or alternatively may be a personal computer. Since each of the computer systems just mentioned typically communicates using a specific communication protocol, buses 13a–13n will correspondingly be those buses specific to the computer system to which they are coupled. That is for example, assuming host 12b is, an open-systems type computer system (e.g. running the UNIX Operating System), bus or communication path 13b would typically be a Small Computer Systems Interface or SCSI type communications path or a Fibre Channel communications path. All communications over bus 13b would therefore adhere to either the SCSI or Fibre Channel communications protocol respectively.

According to a preferred embodiment of the present invention, storage system 14 of computer system 10 is a mass storage system which, as will be described in more detail below, includes several individual components such as controllers, memory and storage devices coupled via an internal communications path. The communications path according to the preferred embodiment may include one or more buses.

Figure 2:
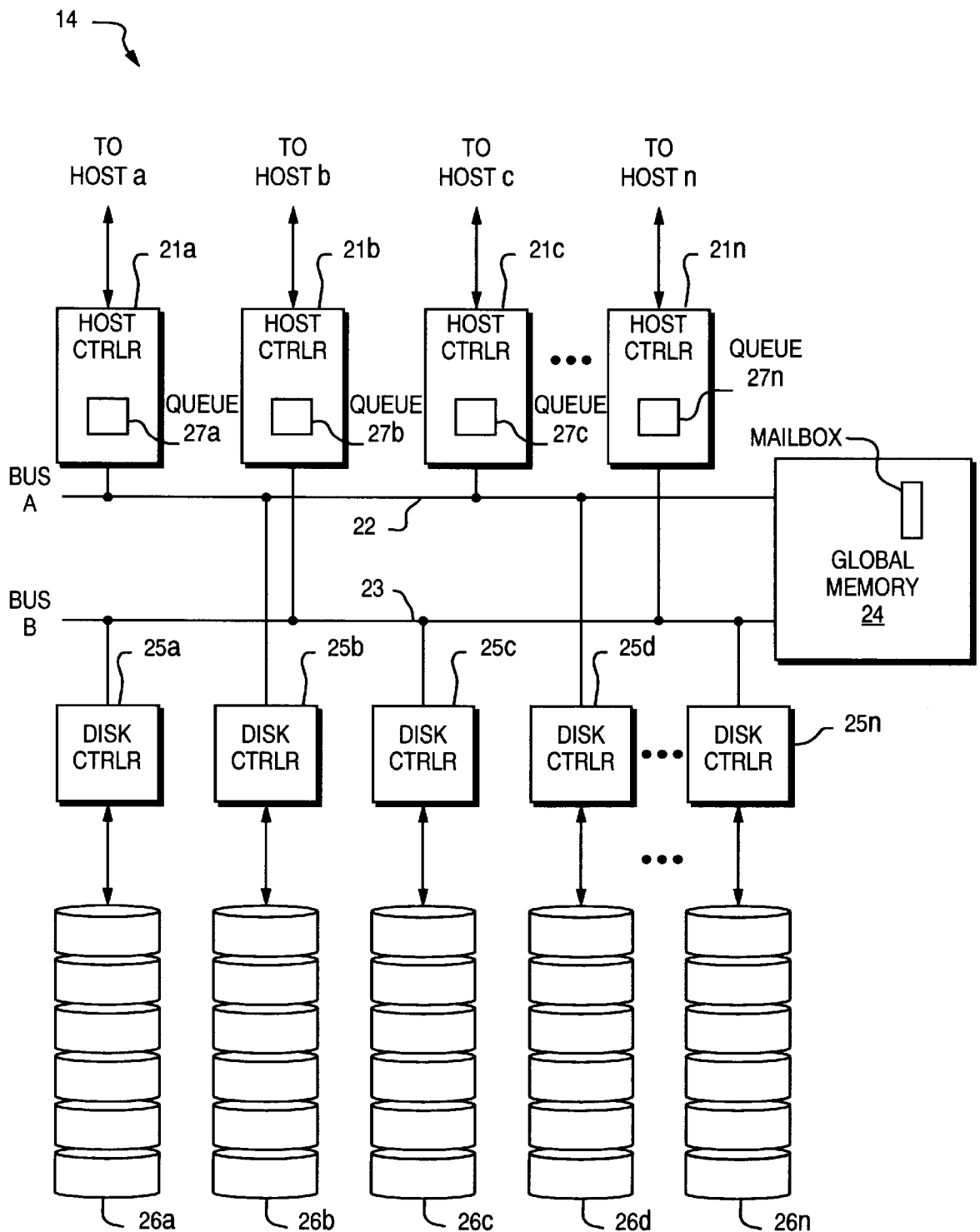
FIG. 2 is a diagrammatic representation of the storage system of FIG. 1.

Referring now to FIG. 2, the storage system 14 of FIG. 1 is shown in more detail. Here, the storage system includes a plurality of host controllers 21a–21n which are, according to a preferred embodiment of the present invention, coupled alternately to buses 22 and 23 labeled A and B respectively. Each host controller 21a–21n is responsible for managing the communication between its associated attached host computer and storage system 14. The host controllers of the preferred embodiment may include one or more central processing units (CPUs). The controller CPUs operate under program control to manage the flow of data between an associated host computer and the storage system 14. In addition, each host controller 21a–21n may also include an internal queue 27a–27n respectively. As will be described in more detail below, the internal queue is used to store incoming requests from an attached host computer until the request can be serviced by the storage system.

Also coupled alternately to buses 22 and 23 are a plurality of disk controllers 25a–25n. Controllers 25a–25n are here similar in construction to controllers 21a–21n. That is, each includes at least one CPU configured to operate under control of a program loaded into an associated CPU program memory. Coupled to each disk controller is an array of storage devices which as shown here may be magnetic disk devices. Generally, each disk device will include one or more logical devices. A logical device is simply a definition given to a portion or all of a storage device so that a host computer may address the device using a convenient addressing scheme. Thus, for example, disk array 26a of storage system 14, which is shown to include six storage devices, may provide six or more logical devices (or volumes) which are all controlled by disk controller 25a. Like the host controllers described above, each disk controller is responsible for managing the communications between its associated array of disk drives and the host controllers or global memory 24 of storage system 14.

In addition to the controllers described above, storage system 14 also includes a global memory 24 coupled to both buses 22 and 23. According to a preferred embodiment of the present invention, a portion of global memory 24 serves as a very large cache. The cache is used as a staging area during the transfer of data between the host computers and the storage devices of disk arrays 26a–26n. In addition, the global memory includes a number of single entry queues or mailboxes. Each logical device of storage system 14 has an associated mailbox in memory 24. The mailboxes are means by which the host controller communicates with the associated logical devices. That is, in order for a host controller to send a request for data to a particular logical volume, the host controller will arbitrate for access to one of the busses 22, 23 in order to communicate with memory 24. Once access is granted, the host controller will attempt to set a lock on the target mailbox. Once locked, the host controller places its request in the mailbox. As will be discussed further below, the host controller maintains the lock on the mailbox until the request has been satisfied by the disk controller associated with the target logical volume.

During operation of computer system 10, one of the host computers may desire to read data from or write data to one of the disk arrays associated within the storage system 14. To do so, the host computer would typically send a request over its associated bus (e.g. bus 13a for host 12a) to the controller attached to that bus (here controller 21a). The host controller 21a, once it receives the request from the host computer, begins performing those tasks necessary to satisfy the request as described above. For example, if the request by the host is to write some portion of data to one of the disks in any of disk arrays 26a–26n, the host controller receiving the request would begin writing the data received from the host to the global memory 24. According to the preferred embodiment, the host controller places a notification in a mailbox (not shown) of memory 24 associated with the appropriate logical device in order to notify the associated disk controller that there is data in the cache or cache portion of the 24 which should be de-staged to a disk drive (e.g. logical device). Once all of the data was written to cache 24, the host controller may send an acknowledge signal back to the host computer indicating that the data was received. Sometime thereafter one of the disk controllers 26a–26n, depending on which logical volume was specified by the host, will begin reading the data from the global memory and writing it to the associated target disk device. According to the preferred embodiment, disk controllers 26a–26n continually monitor the contents of their associated mailboxes in memory 24. If any of the mailboxes indicates an outstanding write data request, the controller will service the request accordingly.

Alternately, if the request received from the host computer was to read data from one of the disk arrays 26a–26n, the host controller would typically first look to the global memory 24 to determine if the data was already resident in the global memory (as may be the case if a previous read was performed for the same data). If the desired data is resident in the global memory, a cache hit condition exists. When there is a cache hit, the host controller reads the data from the global memory and delivers it to the host.

If however the requested data is not resident in global memory, a cache miss condition would exist. Generally, when there is a cache miss, the disk controller associated with the disk having the desired data reads the data from the corresponding disk device and places the data into the global memory 24. As with the write operation described above, the read request is placed in the appropriate mailbox of memory 24. During the monitoring process, the appropriate disk controller will encounter the read request in the mailbox and begin transferring the data associated with the request. When all of the data associated with a request has been placed in the global memory the disk controller typically notifies the host controller that it has completed the transfer of the data into the global memory. This notification is typically done by changing a flag in the mailbox which is monitored by the host controller which placed the request in the mailbox. At this point, the host controller would typically begin streaming the data from cache memory 24 to the requesting host. That is the host controller would read the data from the global memory 24 and deliver it to the requesting host computer. In previous storage systems, the disk controller, which just finished delivering the data to the cache, may, under worst case conditions, sit idle until the host controller completes the data transfer to the host computer. That is, the host controller would wait until it finished streaming data to the host computer before looking into its request queue to see if there is another request which could be sent to the disk controller.

Figure 3:
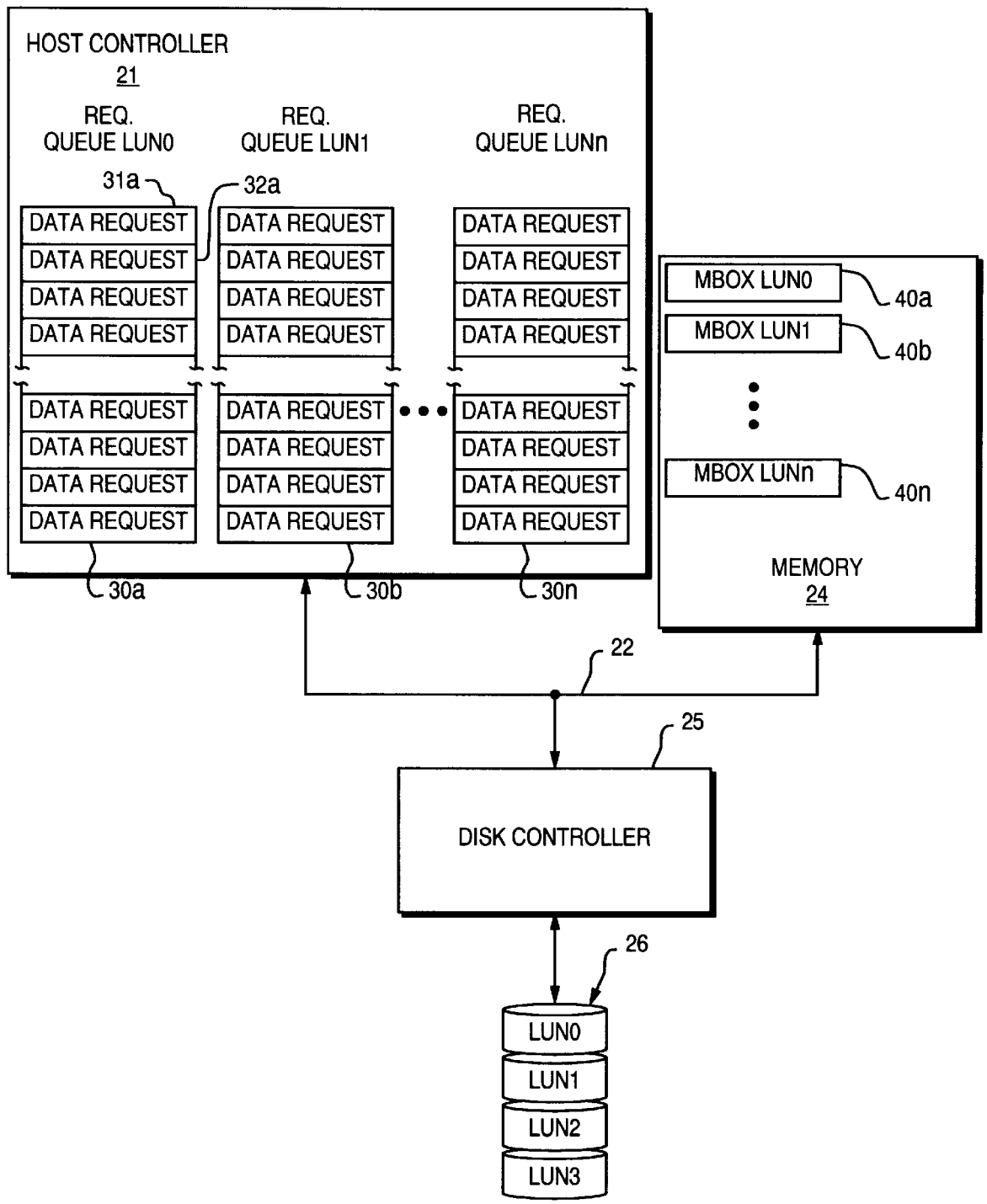
FIG. 3 is a block diagram of a portion of the data storage system of FIG. 2.

In accordance with the present invention, and as will be discussed in more detail below, a method of operating storage system 14 is presented which allows the disk controller to be kept busy servicing requests, simultaneous with the host controller completing the previous request. The preferred embodiment of the method of the present invention will be discussed while referring to FIG. 3. FIG. 3 depicts only a portion of data storage system 14, i.e. a single host controller 21, a single disk controller 25, memory 24, and a disk array 26. It should be understood that the invention applies to the entire storage system and not only to the exemplary controllers shown.

As shown in FIG. 3, host controller 21 includes a plurality of request queues 30a through 30n. The actual number of request queues corresponds to the number of logical devices or logical units (for example, logical unit number 1, i.e. LUN1), which may be accessed by host controller 21. Each request queue is used to store the data request received from the host computer which are directed to a particular logical device. When host controller 21 receives a data request from the host computer, it identifies which logical device is the target of the data request and places the request in the appropriate request queue. For example, a data request to logical device zero would be stored in queue 30a.

As described earlier, memory 24 includes a plurality of mailboxes 40a through 40n where each mailbox is associated with a particular logical device. Thus, the total number of mailboxes in memory 24 corresponds to the total number of logical devices in storage system 14. Each request for read or write of data to a particular logical device requires that the request be placed in the appropriate mailbox corresponding to that logical device. According to the preferred embodiment, each mailbox 40a–40n is only capable of storing a single data request at any given time. It should be noted however that multiple entry mailboxes may be employed to queue several data requests to each logical device of storage system 14.

Assuming a steady state operation of storage system 14, each of the request queues 30a through 30n will generally have several outstanding data requests at any given time. During normal operation, the host controller will generally identify the oldest request in any one of the queues as the one to process next. When the host controller identifies a particular request to be serviced, it will arbitrate for control of bus 22 and begin a communication session with memory 24. During the communication session, the host controller will obtain a lock on the mailbox associated with the logical device which is the target of the data request. Once the mailbox is locked, the host controller will place the entry in the mailbox identifying the data request to that particular logical device. As an example, if the host controller found a data request in queue 30a, it would read that request from queue 30a, obtain a lock on mailbox 40a and then place the appropriate data request information in mailbox 40a. During the time which host controller 21 has a lock on mailbox 40a, no other host controller of storage system 14 may place information (i.e., a data request) into mailbox 40a.

As mentioned earlier, when disk controller 25 is not busy performing a data transfer to or from memory 24, it will constantly monitor the mailboxes associated with its assigned logical devices. Here for example, disk controller 25 monitors mailboxes 40a through 40d in order to identify outstanding requests for logical devices 0–3 of array 26. Once an entry is found in a particular one of the associated mailboxes, disk controller 25 will perform the requested data transaction. When the data request has been completed (e.g. all requested data placed in the cache portion of memory 24), controller 25 will set a flag in the mailbox associated with the logical device which was the target of the data request. Setting the flag indicates that the requested data transfer has taken place.

Like the disk controller 25, host controller 21 periodically monitors the state of the status flags in the mailboxes for which it has placed a data request. Thus, once controller 25 sets the done status flag in the mailbox associated with the data request, the host controller will then know that it can retrieve the data from cache and deliver the data to the requesting host computer.

According to one aspect of the present invention, before releasing bus 22 and before beginning the streaming of data from the cache to the requesting host computer, host controller 21 will first search the request queue of the associated logical device to determine if there are any other data requests outstanding for that same logical device. If there is a request within that logical device request queue, the host controller will immediately place the request in the associated mailbox in memory 24 before the host controller releases the bus or begins streaming data to the requesting host. In addition to the normal request information, the mailbox entry will include an indication that the current request is a pre-request.

As an example of a complete data transaction demonstrating the pre-request features of the present invention, consider entries 31a and 32a of request queue 30a. To service the initial data request in entry 31a, host controller 21 will read the request from queue 30a and place that request in mailbox 40a of memory 24. When disk controller 25 reads the contents of mailbox 40a, it initiates data transaction associated therewith. When the data transaction is complete, host controller 25 sets the done status flag in mailbox 40a. While monitoring the done status flag of mailbox 40a, host controller will determine that the data request associated with entry 31a has been completed. At this time, the host controller will examine the contents of queue 30a and find an entry 32b in queue 30a indicating another data request to logical device zero. At this point, the host controller will write that request (i.e. from entry 32b) to mailbox 40a with an indication that the current request is a pre-request. The request remains in queue 30a, and as will be described, below is treated as an uncompleted request by host controller 21. At this point, the host controller will begin streaming (transferring) the data from the cache portion of memory 24 to the host device associated with the original request from entry 31a. While the transfer of data to the host computer is occurring, the data associated with the new data request for logical device zero may also be simultaneously be transferred from the logical device to the memory. Thus an overall improvement in storage system resources is achieved.

When host controller 21 completes the streaming of data from memory 24 to the requesting host computer, it will look to service the next request in the logical device queue. Since entry 32a will still be in queue 30a, the host controller will attempt to the execute this data request. As described earlier, it will first look to cache portion of the global memory as is normal to see if the data is resident in cache. Since the request has been previously sent to the disk controller 25 via mailbox 40a, there is a high likelihood that the data will be available in cache. This produces the same effect as a cache hit and thus the same performance benefit even though, when the request was originally received by host controller 21, the data was not in the cache.

According to another aspect of the present invention, another instance in which host controller 21 would attempt to send a pre-request to a logical device via the mailboxes in memory 24, is when the data associated with a previous request is in the process of being transferred from the cache portion of memory 24 to the requesting host computer. The purpose of providing this capability is to achieve the above described performance benefit for those instances where a request for data has been completed by disk controller 25 and where the host controller, when it checks the queue associated with the same logical device, finds no outstanding data requests, but that during the time between when the host controller 21 has completed searching the associated request queue and the time that it begins streaming data from the cache portion of memory 24, a new request arrives at host controller 21 and is placed in the request queue associated with the same logical device. In order to gain the same performance improvement as is achieved when a data request is found in a logical device queue before data transfer to the host begins, the host controller will periodically, while it is streaming data from a previous request, examine the request queue associated with that same logical device to see if another request may be placed in the mailbox for that logical device. The operations associated with sending a pre-request to the mailbox are the same as those described above when a controller 21 is able to find a request in the associated queue prior to streaming the data from the cache portion of memory 24 to the requesting host device.

Having described a preferred embodiment of the present invention, it will now become apparent to those of ordinary skill in the art that other embodiments incorporating its concepts may be provided. It is felt therefore that this invention should not be limited to the disclosed embodiment but rather should be limited only by the spirit and scope of the appended claims.

What is claimed is:

1. A storage system comprising:
   a host controller configured to receive data requests from a host computer and store the data requests in a request queue within said host controller;
   a memory coupled to the host controller and including a mailbox location for temporarily storing data associated with the data requests from the host computer; and
   a disk controller coupled to the memory and further coupled to at least one mass storage device within said storage system, said disk controller responsive to placement of a first data request in said mailbox location for performing a data transaction between said at least one mass storage device and said memory and setting a done status flag in said mailbox location when said data transaction is complete,
   said host controller responsive to said done status flag being in a set state for checking said request queue to determine if a second data request is outstanding for said at least one mass storage device and for placing said second request into said mailbox location before transferring data associated with said first data request to said host computer,
   said disk controller responsive to placement of said second data request in said mailbox for performing a second data transaction between said memory and said at least one mass storage device while said data associated with said first data request is transferred from said memory to said host computer.

2. The storage system as in claim 1 wherein said request queue includes individual queues for each logical device of said storage system.

3. The storage system as in claim 2 wherein said mailbox location comprises a single entry queue and wherein each logical device has associated therewith a separate mailbox location.

4. A method of operating a storage system having a host controller, a disk controller, and a memory having a cache, all interconnected by a communication bus and wherein the disk controller is further coupled to a plurality of storage devices, said method comprising the steps of:
   receiving at the host controller a first read data request from a requesting device and placing the first read data request into a request queue within said host controller;
   checking by the host controller whether data corresponding to said first read data request is resident in the memory;
   if the data is not resident in the cache, placing an entry in a message queue associated with one of the plurality of storage devices;
   reading, by the disk controller, the entry from said message queue;
   in response to contents of the entry read from the message queue, transferring data corresponding to said first read data request from the associated one of the plurality of storage devices to the memory;
   notifying the host controller that the data corresponding to said first read data request has been transferred to the memory;
   in response to receipt of the notification at the host controller, checking the request queue to determine if any other read data requests are resident in the request queue for said associated one of the plurality of storage devices;
   prior to transferring data corresponding to the first read data request from the memory to a requesting device associated with the first read data request, inserting another entry in the message queue, the another entry corresponding to said other read data request resident in the request queue;
   transmitting the data corresponding to the first read data request from the memory to the host controller; and
   during performance of the transmitting step, transferring data associated with the another entry from another one of the plurality of storage device associated with the another read request to the memory.

5. The method as in claim 4 wherein said request queue includes individual queues for each logical device of said storage system and wherein said step of receiving and placing includes identifying a logical device associated with said data request and placing said first data request in an associated one of said individual queues.

6. The method as in claim 5 wherein said message queue includes a mailbox location for each logical device of said storage system and wherein said step of placing an entry in said message queue includes placing an entry in a mailbox location associated with one of said logical devices which is the target of said data request.

7. A method of operating a storage system having a host controller, a disk controller, and a memory all interconnected by a communication bus and wherein the disk controller is further coupled to a plurality of storage devices, said method comprising the steps of:
   receiving at the host controller a read data request from a requesting device and placing the read data request into a request queue;
   checking by the host controller whether data corresponding to said read data request is resident in the memory;
   if the data is not resident in the cache, placing an entry in a message queue associated with one of the plurality of storage devices;

reading, by the disk controller, the entry from said message queue;

in response to contents of the entry read from the message queue, transferring data corresponding to said read data request from the associated one of the plurality of storage devices to the memory;

notifying the host controller that the data corresponding to said read data request has been transferred to the memory;

transmitting the data corresponding to the read data request from the memory to the requesting device; and while transferring the data corresponding to the read data request from the memory to said requesting device, checking the request queue to determine if any other read data requests are resident in the request queue for said associated one of the plurality of storage devices;

inserting another entry in the message queue, the another entry corresponding to said other read data request resident in the request queue; and during performance of the transferring step, transferring data associated with the another entry from one of the plurality of storage devices associated with the another read data request to the memory.

* * * * *